A. J. WEST.
LUBRICATING DEVICE.
APPLICATION FILED JULY 12, 1911.

1,027,092.

Patented May 21, 1912.

WITNESSES

INVENTOR:
Arthur J. West,
by Dodge and Sons,
Attorneys

UNITED STATES PATENT OFFICE.

ARTHUR J. WEST, OF SOUTH BETHLEHEM, PENNSYLVANIA.

LUBRICATING DEVICE.

1,027,092.  Specification of Letters Patent.  Patented May 21, 1912.

Application filed July 12, 1911. Serial No. 638,131.

*To all whom it may concern:*

Be it known that I, ARTHUR J. WEST, a citizen of the United States, residing at South Bethlehem, in the county of Northampton and State of Pennsylvania, have invented certain new and useful Improvements in Lubricating Devices, of which the following is a specification.

This invention relates to lubricating devices and particularly to a tubular connection for carrying oil to engine crank pins in force feed lubricating systems.

The purpose of the invention is to secure such a connection which shall be oil tight at ordinary pressures, which shall permit satisfactory action even when the parts are not perfectly alined and which shall be readily disconnected for inspection and repair.

The preferred embodiment of the invention is shown in the accompanying drawing, in which:—

Figure 1:
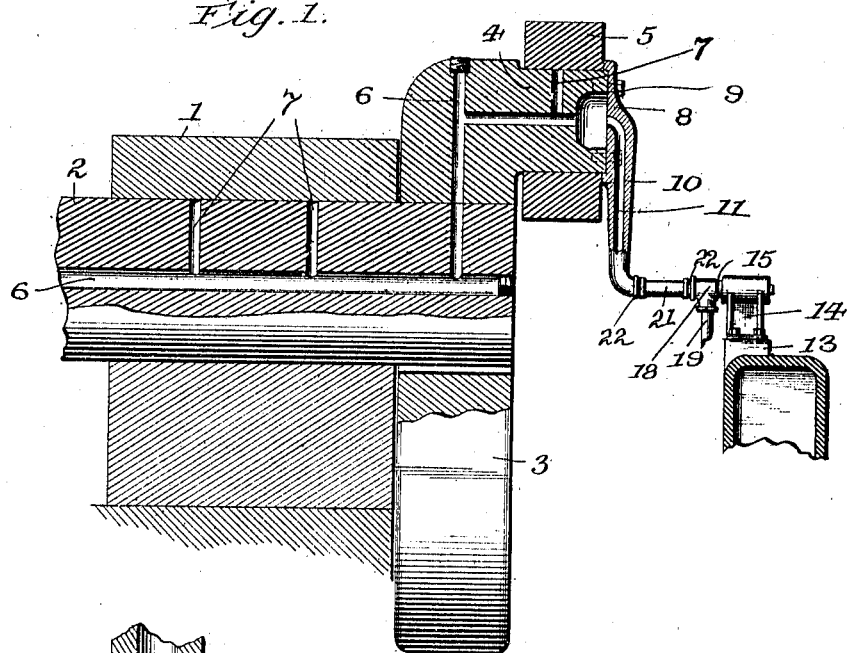
Figure 2:
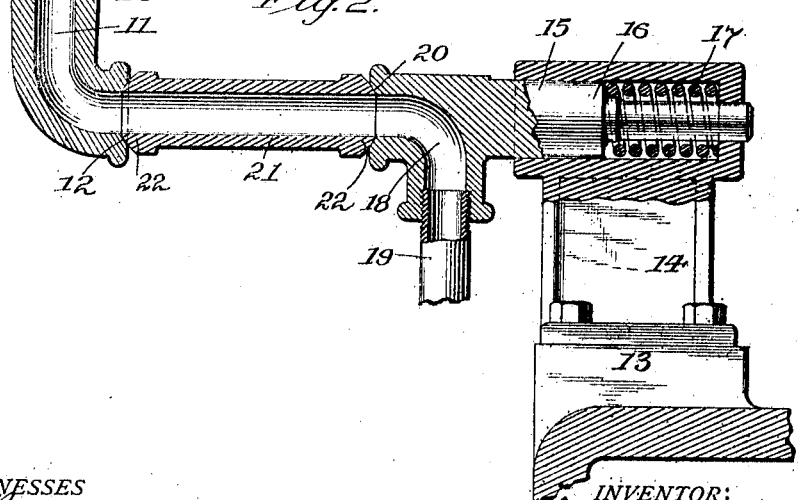

Figure 1 is a view, partly sectional, of a crank showing my connection applied, the section being taken on the center line of the shaft and crank; and Fig. 2 is an enlarged sectional view of the connecting tube and the retaining means.

In the drawing, 1 represents a main engine bearing, 2 the main shaft, 3 the crank disk, 4 the crank pin and 5 the end of the connecting rod. These parts are of any usual construction.

Formed in the crank pin, crank disk and shaft is a duct 6 provided with branch ducts 7 by which oil is conveyed to the crank pin bearing, main bearing, etc., the number and arrangement of the ducts being such as to lubricate all bearings which may be lubricated from the main shaft.

The crank pin cap 8 is retained on the crank pin by studs and nuts 9 and is provided with a radial arm 10 extending inwardly to a point on the axis of the main shaft 2. This arm has a duct 11 connecting with the duct 6 and merging at the end of the arm 10 into a spherical recess 12.

Mounted on a standard 13 rigidly connected to the engine base or setting is a bracket 14 in which is guided a plunger 15 having a shoulder 16. A helical spring 17 is interposed between the shoulder 16 and a portion of the bracket 14 to urge the plunger, which is coaxial with the main engine shaft 2, toward that shaft.

An oil duct 18 is formed in the plunger 15 and to one end of this is attached the oil supply pipe 19 so that in effect this plunger becomes the end portion of the oil pipe. The other end of the duct is at the end of the plunger toward the engine shaft and merges into a spherical recess 20 coaxial with the engine shaft. A connecting tube 21 having spherical ends 22 is inserted between the arm 10 and the plunger 15, the spherical ends bearing in and making close contact with the recesses 12 and 20. The spring 17 maintains such close contact at the points of juncture of the connecting tube with the plunger and arm as practically to prevent leakage of the oil and the spherical ends on the connecting tube permit relative movement of the engine shaft and standard. Oil forced by a pump or otherwise flows through the pipe 19, duct 18, connecting tube 21 to the duct 11 of the arm whence it is distributed by the ducts 6 and 7 to the various bearings. The connecting tube 21 may be removed readily, by forcing back the plunger 15. The connection requires no packing or adjustment, the spring plunger making up the wear automatically, and preserving oil tight contact.

It is obvious that the invention may be applied to any shaft whether having a crank or not, and that it will operate satisfactorily even though the various parts are not accurately alined. Accurate adjustment is, however, desirable as reducing the wear.

Having thus described the invention, what I claim is:—

1. In a lubricating device for crank shafts, the combination of a crank shaft having a duct extending therefrom and terminating in alinement with its axis; an oil feed pipe; a spring serving to urge said pipe toward the mouth of the duct; and a removable hollow coupling or member interposed between the discharge end of the pipe and the mouth of the duct and forming a conduit for the lubricant.

2. In a lubricating device for crank shafts, the combination of a crank shaft having a duct extending therefrom and terminating in alinement with its axis; an oil feed pipe; a spring serving to urge said pipe toward the mouth of the duct; and a tubular connection having spherical end bearing portions coacting with the discharge end of the pipe and the inlet openings of the duct to form tight joints.

3. In a lubricating device, the combination of a rotating element having a spherical recess located adjacent the axis of rotation and a duct communicating therewith; a fixed element; a plunger guided by the fixed element and having a spherical recess approximately coaxial with the rotating element and a duct communicating with the recess; a spring urging the plunger toward the rotating element; and a tubular connecting element communicating at its ends with the above-named ducts and formed at its ends with spherical bearings closely fitting in said recesses and retained therein by the pressure of the spring exerted through the plunger.

4. In a lubricating device, the combination of a shaft; a crank and crank pin carried thereby, the above enumerated parts being provided with suitable oil ducts; a crank pin cap formed with an inwardly extending arm having a duct communicating with the said oil ducts and merging into a spherical recess adjacent the axis of rotation of the shaft; a fixed member; a plunger guided by said member and provided with an oil duct merging into a spherical recess approximately on the axis of rotation of the shaft; a spring urging the plunger toward the arm; and a tubular member connecting the oil duct in the plunger with those in the shaft and crank, the said member having ends making close fits with the recesses and being held in position by the pressure of the spring.

5. In a lubricating device, the combination of a shaft; a crank and crank pin carried thereby, the above enumerated parts being provided with suitable oil ducts; an inwardly extending arm having a duct communicating with the said oil ducts and merging into a spherical recess adjacent the axis of rotation of the shaft; a fixed member; a plunger guided by said member and provided with an oil duct merging into a spherical recess approximately on the axis of rotation of the shaft; a spring urging the plunger toward the arm; and a tubular member connecting the oil duct in the plunger with those in the shaft and crank, the said member having ends making close fits with the recesses and being held in position by the pressure of the spring.

In testimony whereof I have signed my name to this specification in the presence of two subscribing witnesses.

ARTHUR J. WEST.

Witnesses:
B. A. Brennan,
J. E. Pickard.